United States Patent [19]
Hirst

[11] Patent Number: 5,436,746
[45] Date of Patent: Jul. 25, 1995

[54] OPTICAL TRANSMISSION SYSTEM

[75] Inventor: Ian J. Hirst, Orpington, United Kingdom

[73] Assignee: Northern Telecom Limited, Montreal, Canada

[21] Appl. No.: 168,530

[22] Filed: Dec. 15, 1993

[30] Foreign Application Priority Data

Dec. 15, 1992 [GB] United Kingdom ............... 9226136
Apr. 20, 1993 [GB] United Kingdom ............... 9308099

[51] Int. Cl.⁶ ...................... H04B 10/08; H04B 10/00
[52] U.S. Cl. ................................... 359/110; 359/153; 359/173; 359/179; 375/213; 371/20.2
[58] Field of Search ............... 359/110, 134, 143, 153, 359/160–162, 166, 173, 176–177, 179, 182, 341, 174; 370/13.1, 15; 379/4–5; 371/20.2; 375/31, 22–23; 455/15; 372/6; 340/825.06; 356/303, 73.1

[56] References Cited

U.S. PATENT DOCUMENTS

| | | | |
|---|---|---|---|
| 3,967,283 | 6/1976 | Clark et al. | 342/28 |
| 4,887,309 | 12/1989 | Andersson et al. | 359/110 |
| 5,212,713 | 5/1993 | Frisch | 370/13.1 |

FOREIGN PATENT DOCUMENTS

| | | | |
|---|---|---|---|
| 0013018 | 1/1991 | Japan | 359/110 |
| 0042927 | 2/1991 | Japan | 359/110 |
| 3058037 | 11/1991 | Japan | 359/177 |
| 4137833 | 5/1992 | Japan | 359/174 |

OTHER PUBLICATIONS

Hadjifotiou et al. "Supervisory Options for Fibre Optical Amplifier Systems" 4th IEE Conference on Telecommunications, 18–21 Apr. 1993. pp. 53–56.

Primary Examiner—David K. Moore
Assistant Examiner—Kinfe-Michael Negash
Attorney, Agent, or Firm—Lee, Mann, Smith, McWilliams, Sweeney & Ohlson

[57] ABSTRACT

An optical transmission system comprises amplified forward and return paths between a local station and a remote station. Each amplifier of the forward path has an attenuated loopback coupling its output to the return path. Frequency modulated supervisory signals generated at the local station are returned via the loopbacks. These signals are analysed e.g. by Fourier analysis to obtain a measure of the performance of each amplifier. The system may also be employed for the location of fiber breaks.

4 Claims, 4 Drawing Sheets

OPTICAL TRANSMISSION SYSTEM

This invention relates to optical transmission systems in which the transmission path incorporates a concatenated chain of optical amplifiers, e.g. erbium amplifiers. In particular the invention relates to supervisory systems for such a transmission system.

BACKGROUND OF THE INVENTION

A recent development in the optical transmission field has been the introduction of amplified systems. These systems dispense with the convention digital repeaters or regenerators, commonly referred to as "3R repeaters", and instead provide direct amplifications of the transmitted signal. This can result in a significant cost reduction as the expensive 3R repeaters of a conventional system can be replaced by relatively low cost amplifiers. Typically an amplified system comprises an optical fibre path along which optical amplifiers are disposed at regular intervals. These amplifiers may comprise erbium amplifiers.

A problem associated with the introduction of amplified systems has been the lack of a suitable supervisory system to provide remote monitoring of the performance of each system amplifier. It will be appreciated that, in an amplifier system where there is no retiming or reshaping of the transmitted signal, poor performance of a single amplifier can seriously impair the operation of the system. The successful commercial operation of such a system cannot therefore be achieved without an adequate supervisory system.

The object of the invention is to minimise or to overcome this disadvantage.

SUMMARY OF THE INVENTION

According to the invention there is provided a supervisory system for an optical transmission system comprising a local station, a remote station, and forward and return signal paths between the local and remote stations and each of which paths comprise a concatenated chain of optical amplifiers, the supervisory system including means for applying supervisory signals to an optical signal transmitted from the local station, means for coupling a minor proportion of the output of each said amplifier of the forward path to the return path, and means disposed at the local station for receiving the signals returned from each said amplifiers and for analysing said signals whereby to evaluate the performance of each said amplifier.

According to the invention there is provided a method of supervisory control of an optical transmission system having forward and return data transmission paths each of which is provided with spaced optical amplifiers, the method including a frequency modulated supervisory signal to data transmitted on the forward path, providing at each amplifier of the forward path a signal loopback whereby to couple a small proportion of the transmitted signal to the return path, extracting returned supervisory signals from data received from the return path, and analysing said extracted signals whereby to determine the performance of each said forward path amplifier.

In a preferred embodiment, supervision is performed from both ends of the transmission path. This is of particular advantage in the location of system faults arising both from amplifier failure and from fibre breaks.

In the description below it will be appreciated that supervision can be effected from either or both ends of the system.

BRIEF DESCRIPTION OF THE DRAWINGS

Embodiments of the invention will now be described with reference to the accompanying drawings in which.

DESCRIPTION OF PREFERRED EMBODIMENT

Figure 1:
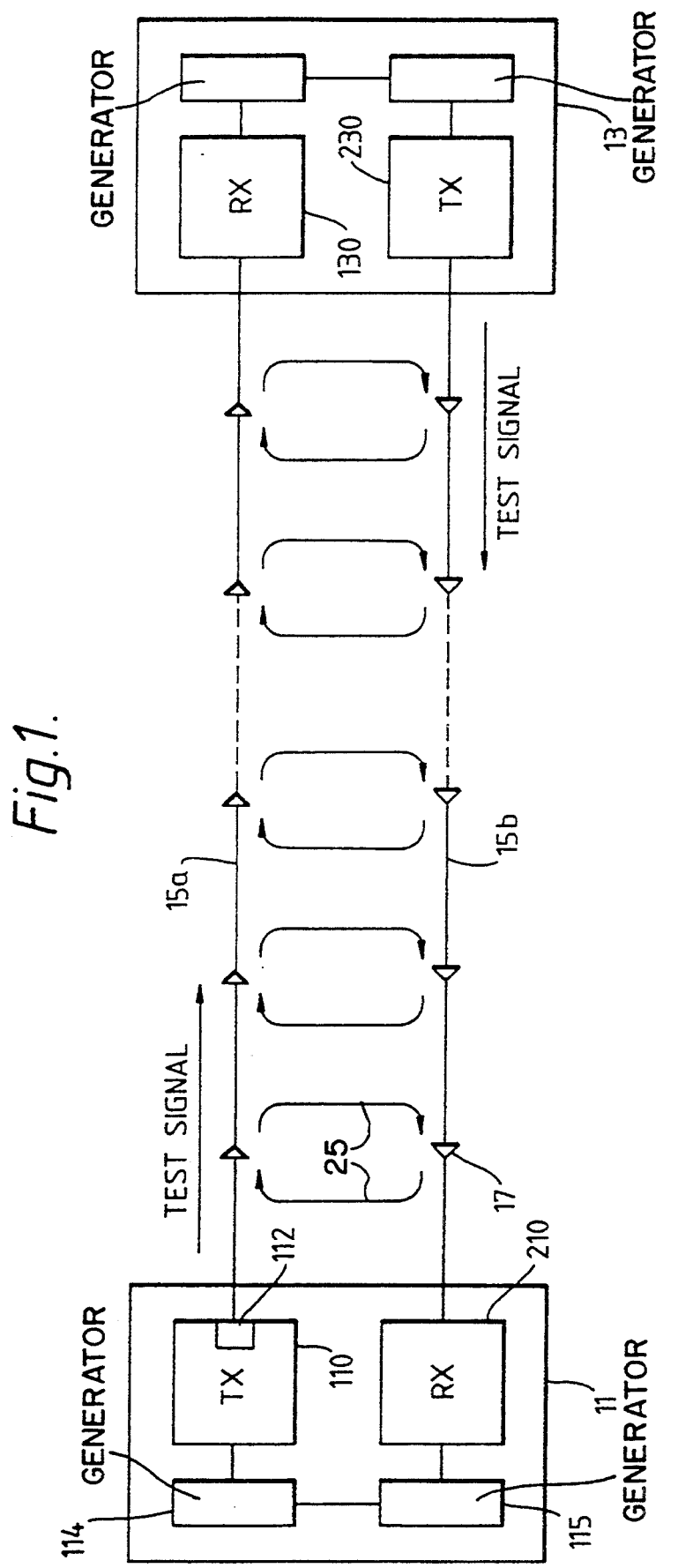
FIG. 1 is a schematic diagram of an optical transmission system having a plurality of amplifiers.

Referring to FIG. 1, the system includes a local station 11 incorporating transmitter 110 and a receiver 210, and a remote station 13 incorporating a receiver 130 and a transmitter 230. Each transmitter incorporates a light source 112, 212 respectively and comprising e.g. an infra-red laser. The local and remote stations are coupled via forward (15a) and return (15b) optical transmission paths each of which incorporates a plurality of optical amplifiers 17, e.g. erbium amplifiers. In a transoceanic system each transmission path may incorporate as many as 300 amplifiers. Each amplifier 17 of the forward path 15a is provided with an optical loopback 25 to the return path whereby a small portion of that amplifier output is returned to the sending station 11 via the return path 15b. Similarly, each amplifier of the return path may be provided with an optical loopback whereby a small portion of that amplifier output is returned to the remote station via the forward path.

At the local station a supervisory signal from generator 114 is superimposed on the optical data signal launched on to the transmission path e.g. by intensity modulation of the light source 112. The depth of the modulation is small, typically 5 to 10%, to minimise any impairment of the data signal. When the system id out of service due to an underwater fault, the modulation index can be increased, typically from 50 to 100% to improve the sensitivity.

Figure 2:
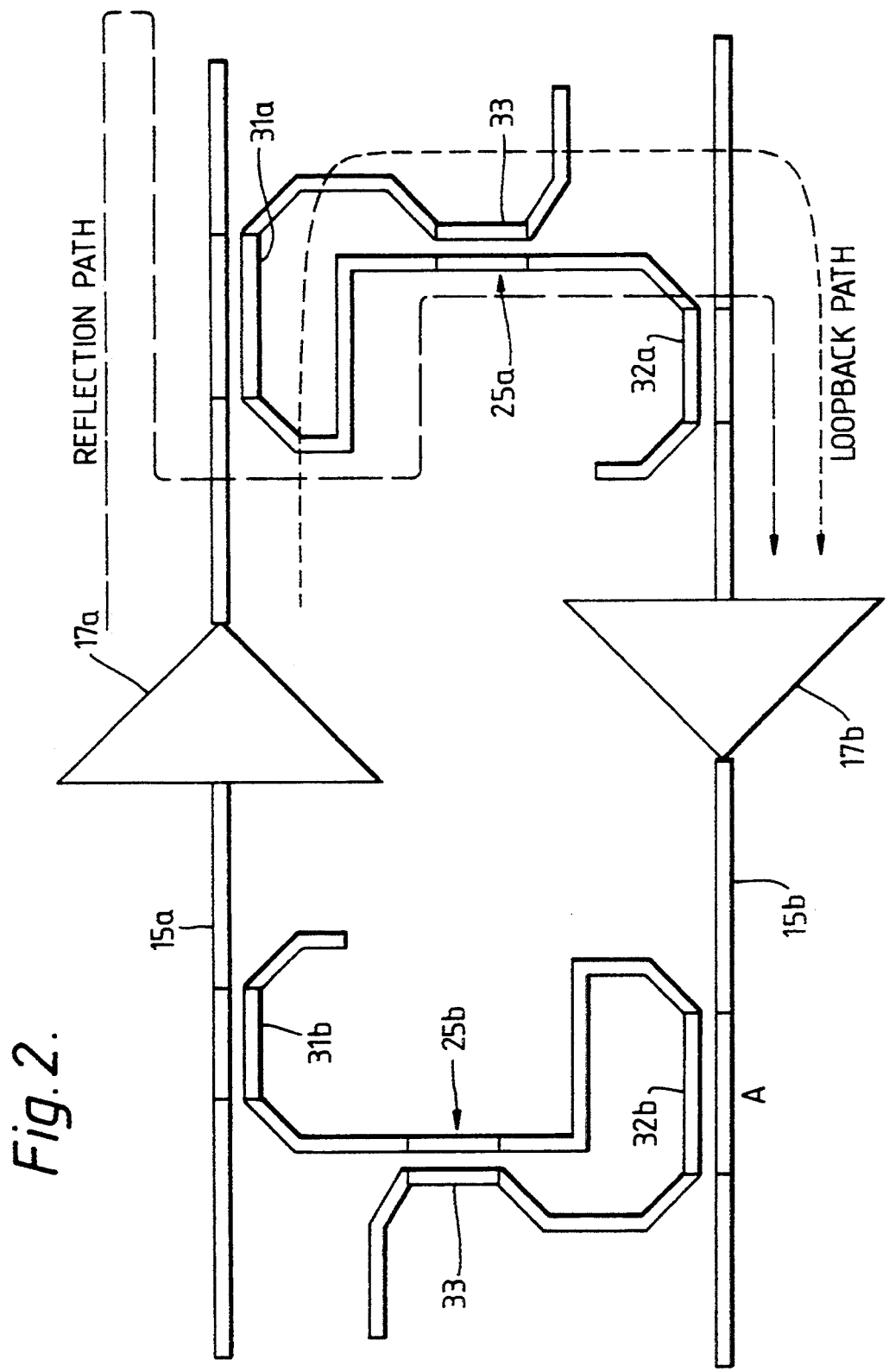
FIG. 2 illustrates a method of providing loopback of signals in the system of FIG. 1.

FIG. 2 illustrates a technique whereby signal loopback to effect supervision may be achieved. The loopback arrangement shown allows supervision from either end of the system e.g. to determine loop gain and to monitor reflections generated by the fibre faults. Many other arrangements of the couplers that connect the two directions of transmission are possible.

As shown in FIG. 2, loopbacks 25a, 25b may be provided between the forward and return fibres 15a, 15b and disposed between the respective inputs and outputs of the forward and return amplifiers 17a and 17b.

Each loopback incorporates a first coupler 31a, 31b associated with the respective one fibre path at the corresponding amplifier output, and a second coupler 32a, 32b associated with the respective other fibre path at the corresponding amplifier output. Each loopback may have a further coupler 33 whereby to provide differential attenuation between the loopback and reflection paths.

Each coupler in the loopback 25a, 25b provides attenuation of the coupled signals, the coupler losses being adjusted so that the signals transferred from one fibre to another are small in comparison with the data signals carried on the fibres. This minimises interference with the data signals. In some applications, optical attenuators (not shown) may be provided to reduce further the coupling between the two fibre transmission paths. Typical losses from the loopback and reflection paths are 45 dB and 25 dB respectively.

It will be appreciated that the returned supervisory signal representing the loopback signals and, in the event of a fibre fault, the reflection signals for the amplifiers of the forward path will be at a very low level in comparison with the incoming data signals and the inevitable background noise. To recover and analyse these returned supervisory signals we employ a technique in which a linear frequency modulation is applied to the supervisory signal.

Figure 3:
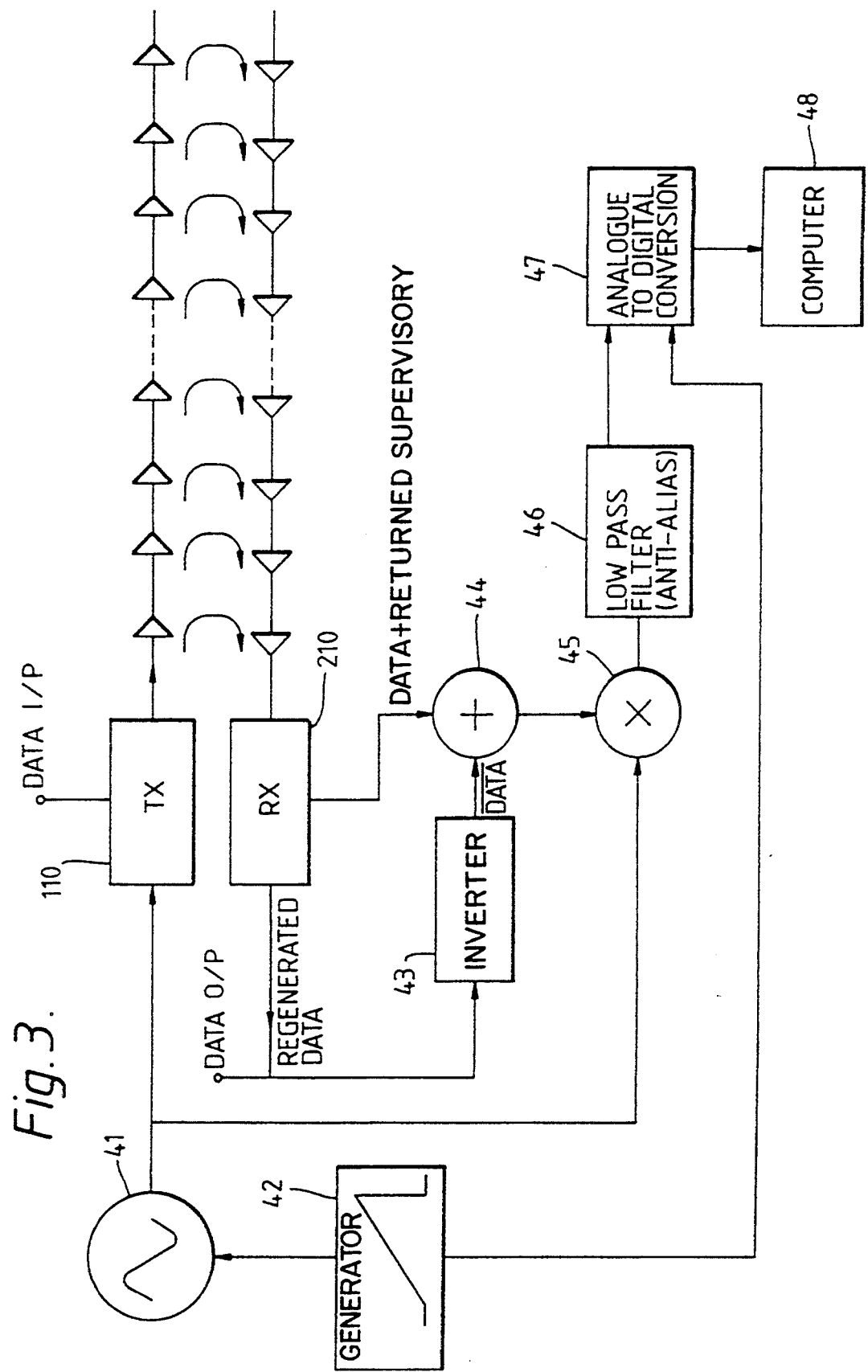
FIG. 3 shows a linear frequency modulation signal analyser for use with the system of FIG. 1.

A circuit arrangement for frequency modulating supervisory signals and for analysing returned signals is shown in schematic form in FIG. 3 of the accompanying drawings. The supervisory signal is generated by oscillator 41 which is frequency modulated by a sawtooth or ramp generator 42 to provide a substantially linear modulation. The modulated signal is fed to the transmitter 110 and is thus launched on to the forward transmission path 15a together with the transmitted data.

The composite signal from the return path 15b is fed to the receiver 210 which extracts and regenerates the incoming data to provide DATA output. The receiver also amplifies the composite signal and provides an output comprising DATA and returned supervisory signals. A portion of the DATA output from the receiver is fed to an inverter 43 to provide an inverted signal (DATA). This DATA signal is fed to one input of a summation circuit 44 the other input of which receives the DATA and returned supervisory signal from the receiver. The output of the summation circuit, which is thus the wanted returned supervisory signal, is fed to one input of a multiplier circuit 45 the other input of which is coupled to the output of the oscillator.

We have found that the use of this data cancellation technique can provide an increase of about 20 dB in the signal to noise ratio of the returned supervisory signal. This is of particular advantage as the returned supervisory signal is at a very low level.

The multiplicand output from the multiplier 45 is fed via a low-pass filter 46 to an analogue-to-digital converter 47. This converter is synchronised with the ramp generator 41. The output of the analogue-to-digital converter 46 may be fed to a computer 48 programmed to perform Fourier analysis of the signals whereby to determine e.g. the loop gain corresponding to each system amplifier.

The loopbacks at each repeater provide N copies of the transmitted sweep to be returned to the transmit terminal on the inbound fibre. Multiplication by the transmitted signal generates the difference frequencies, one for each loopback (the additive frequencies are rejected by the anti alias low pass filter). Neglecting any noise, this waveform will be the sum of N sinusolds, and this is the waveform which is sampled by the A/D converter 47. For the waveform to have each frequency present, the sampling is timed to start when the loop via the furthest repeater has returned the start of the sweep.

Also the last sample that can be taken must be at the end of the sweep. These two timings can be generated from the sweep to provide start and stop signals to the A/D converter 47 to ensure synchronisation of the converter with the sweep signal.

The signal to noise ratio (SNR) can be improved by adding together successive sweeps. This requires that the returned signals are always in the same phase, hence the requirement that each sweep must be identical and that the samples taken by the A/D converter are at the same points in time of each frequency sweep. The noise being random, will average to zero for a large number of sweeps.

In the arrangement of FIG. 3, the application of a linearly frequency modulated signal to the forward transmission path results in N copies of the signal being returned via the loopbacks and the return path where N is the number of amplifiers in the forward path. At the local station the N copies or echoes of the frequency modulated signal are multiplied each by the original frequency modulated signal. The multiplicand is low-pass filtered to extract the difference frequencies produced by the multiplication.

The FM signal sent to line is:

$$V_{send} = \sin\left(wt + \frac{\Delta wt^2}{2T}\right) \quad 1$$

and we have $$\text{Instantaneous frequency } \frac{dw(t)}{dt} = w + \frac{\Delta w}{T} t$$

$$\text{Instantaneous phase } = wt + \frac{\Delta w}{2T} t^2$$

The change in angular frequency in time T is $\Delta w$. Each loopback will generate one copy of the FM signal resulting in N copies being returned. The received supervisory signal is then given by the expression:

$$V_{receive} = \sum_{k=1}^{N} V_k \sin\left(w(t - T_k) + \frac{\Delta w}{2T}(t - T_k)^2\right) \quad 2$$

where $T_k$ is the delay via the kth amplifier and $V_k$ is the amplitude of that kth copy of the signal.

Multiplying equation 1 by equation 2 and retaining only the difference frequencies, we obtain:

$$V_{diff} = \frac{1}{2} \sum_{k=1}^{N} V_k \cos\left(\frac{\Delta w T_k}{T} t + wr_k - \frac{wt^2_k}{2T}\right) \quad 3$$

where $$-\frac{\Delta w T_k}{2T}$$

is the frequency representing the kth repreater and $$T_k w - \frac{\Delta w T^2 k}{2T}$$

is its phase

Figure 4A:
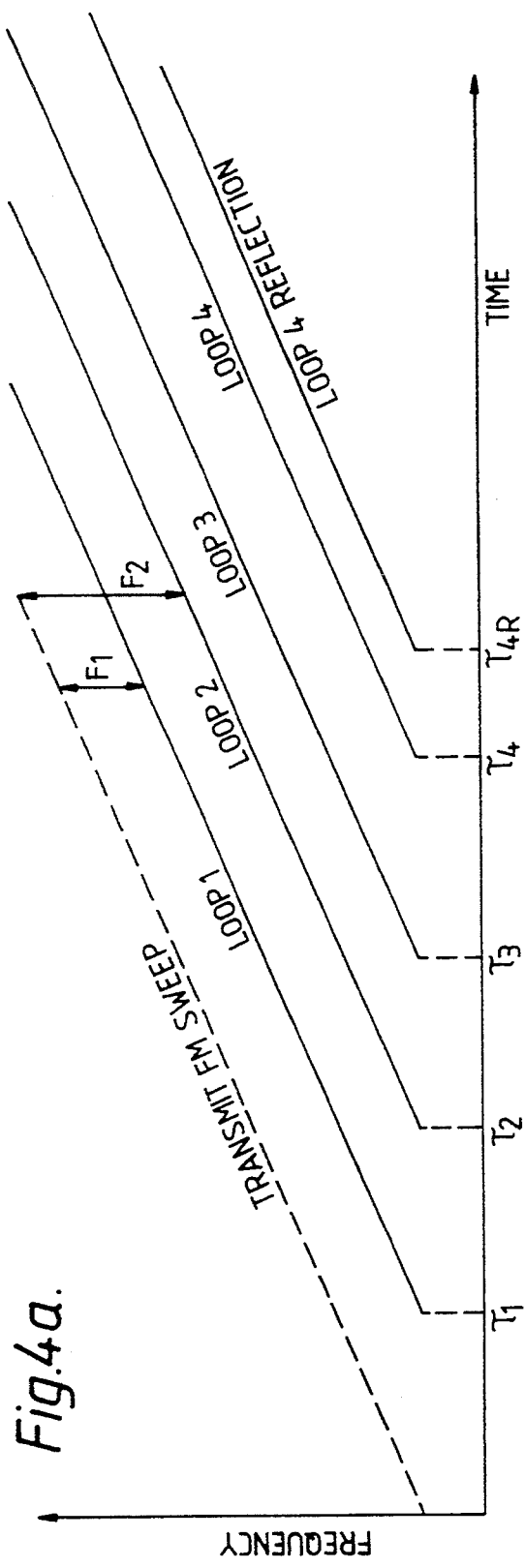
FIG. 4a and 4b illustrate the operation of the analyser of FIG. 3.
Figure 4B:
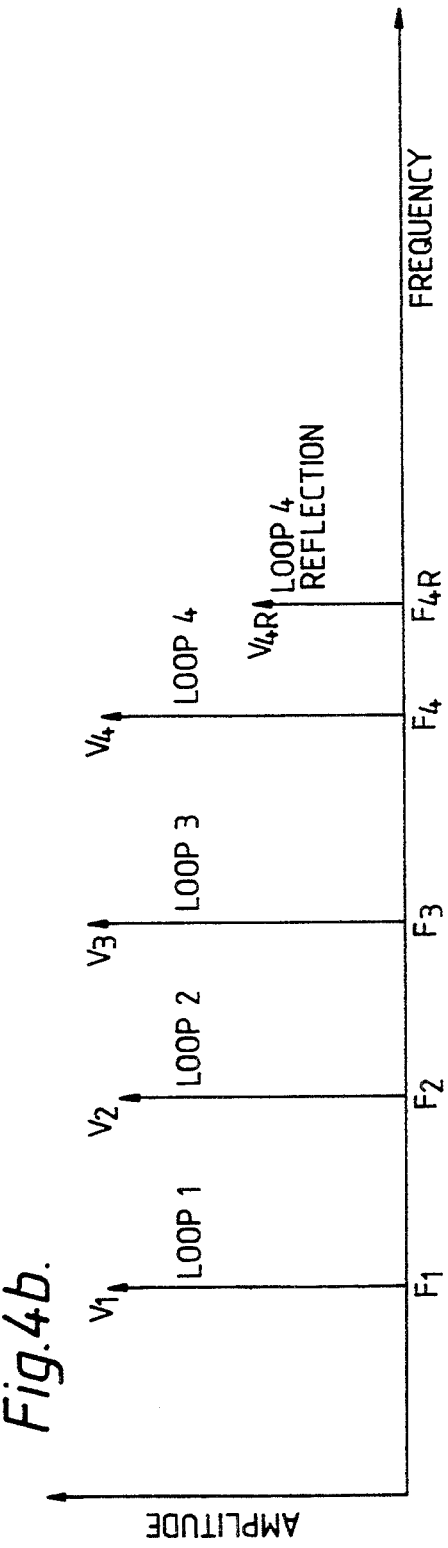

Thus, by means of the linearly frequency modulated supervisory signal, a set of frequencies can be generated whose amplitudes and frequencies represent the loop gain and loopback position respectively for each system loopback. FIG. 4 illustrates how the frequencies are generated by the time delay and multiplication. FIG. 4a illustrates the frequency/time pattern of the returned signals while FIG. 4b illustrates the returned signal frequency spectrum.

As an example of operation of the system, we consider a system of e.g. 5000 km in length with 100 amplifiers spaced at 50 km intervals in each of the forward and return paths. In such a system the time delay around the kth loop is the ratio of the loop distances and the speed of light is the fibre medium, the latter being typically $2 \times 10^5$ km/sec. The delays for the shortest and longest loop are thus 0.5 Msec and 50 mSec respectively.

In order the maximise the signal to noise ratio of the returned supervisory signals, a narrow bandwidth should be employed by the detection circuits. This may be accomplished by digital sampling and by use of the Fourier transform. In the example given above the frequency corresponding to the longest loop is typically 1 Hz and the corresponding rate of frequency change, which rate is the reciprocal of the delay, is 20 Hz/sec. The lowest frequency corresponding to the shortest loop is then 10 mHz, the signals corresponding to the intermediate amplifiers being spaced at 10 mHz intervals. By sampling the returned signals over a period the equivalent bandwidth generated by the Fourier transform can be very small thus improving the signal-to-noise ratio. Further improvement can be achieved by summing repeated frequency sweeps and averaging the results. The improvement factor in the signal-to-noise ratio achieved is approximately $10Log_{10}(S)$ where S is the number of sweeps.

In normal operation of the system, supervisory signals returned via reflector paths will be negligible as the optical path between amplifiers is designed to eliminate discontinuities which cause reflections. However, in the event of a fault such as a cable break, the broken fibres in the cable will produce a reflection.

In submarine installation, the electrical conductivity of the surrounding sea water provides an effective earth whereby the system amplifiers can be powered as far as the fault. With the amplifiers powered the supervisory signal returned via the reflection path can then be employed to determine the fault location.

In the system described above the loopbacks are designed to provide less alternation to reflected signals than to the loopback signals employed in normal operation. This is desirable as the reflection signal from a broken fibre end is small and is attenuated by the length of fibre between the break and the nearest amplifier.

Where a fibre break has been experienced, the system can of course no longer carry data from the local to the remote station. It is therefore possible to improve the signal-to-noise ration of the reflected signal by increasing the modulation depth of the supervisory signal sent from the local station. Further, as the optical amplifiers in the return path will no longer be carrying data, they are not driven into saturation by data signals and can thus provide a high degree of amplification to the reflection signals.

Although the technique has been described above with particular reference to submarine systems, it may of course also be employed on long haul landline systems.

I claim:

1. A supervisory system for an optical transmission system comprising a local station, a remote station, and forward and return signal paths between the local and remote stations and each of which paths comprise a concatenated chain of optical amplifiers, the supervisory system including means for applying supervisory signals to an optical signal transmitted from the local station, means for coupling a minor proportion of the output of each said amplifier of the forward path to the return path, and means disposed at the local station for receiving the signals returned from each said amplifiers and means disposed at the local station for analysing said signals whereby to evaluate the performance of each said amplifier, wherein said supervisory signals are frequency modulated with a linear ramp repetitive waveform, said signal analysing means comprising means for extracting data signals from the received signals, means for generating inverted data signals from said extracted data signals, and means for combining said inverted data signals with a portion of the received signal to recover the supervisory signals.

2. A supervisory system as claimed in claim 1 including means for effecting Fourier analysis of the supervisory signals whereby to evaluate each portion of the supervisory signal returned from a corresponding system amplifier, said means for effecting being connected to said means for applying supervisory signals.

3. A method of supervisory control of an optical transmission system having forward and return data transmission paths each of which is provided with spaced optical amplifiers, the method including the steps of applying a supervisory signal frequency modulated with a linear ramp repetitive waveform to data transmitted on the forward path, providing at each amplifier of the forward path a signal loopback coupling a small proportion of the transmitted signal to the return path, extracting returned supervisory signals from data received from the return path, and analysing said extracted signals to determine the performance of each said forward path amplifier, said signal analysing step further including recovering the returned supervisory signals by extracting data signals from the received signals, and combing the inverse of the data signals with a portion of the received signals to remove data signals from that portion of the signal.

4. A method as claimed in claim 3 including the further step of subjecting the recovered supervisory signals to Fourier analysis to evaluate each portion of the supervisory signal returned from a corresponding system amplifier.

* * * * *